(12) United States Patent
Ota (10) Patent No.: US 11,334,621 B2
(45) Date of Patent: May 17, 2022

(54) IMAGE SEARCH SYSTEM, IMAGE SEARCH METHOD AND STORAGE MEDIUM (71) Applicant: CANON KABUSHIKI KAISHA, Tokyo (JP)

(72) Inventor: Yuya Ota, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/221,024

(22) Filed: Apr. 2, 2021

(65) Prior Publication Data

US 2021/0224322 A1 Jul. 22, 2021

Related U.S. Application Data (63) Continuation of application No. 16/294,195, filed on Mar. 6, 2019, now Pat. No. 10,997,239.

(30) Foreign Application Priority Data

Mar. 9, 2018 (JP) .............................. JP2018-043458

(51) Int. Cl.
*G06F 16/732* (2019.01)
*G06F 16/738* (2019.01)
*G06F 3/04847* (2022.01)

(52) U.S. Cl.
CPC ...... *G06F 16/7328* (2019.01); *G06F 3/04847* (2013.01); *G06F 16/738* (2019.01)

(58) Field of Classification Search
CPC . G06F 16/7328; G06F 16/738; G06F 3/04847
See application file for complete search history.

(56) References Cited

U.S. PATENT DOCUMENTS 10,437,879 B2 * 10/2019 Holzer ............... G06K 9/00201
2005/0219239 A1 * 10/2005 Mashitani ............ H04N 13/275
345/419

(Continued)

FOREIGN PATENT DOCUMENTS

JP  2004145564 A  5/2004

OTHER PUBLICATIONS

Nozomi Ashitani, "Real-time player trajectory acquisition method for presenting player viewpoint images in soccer scene," The Journal of Image Electronics Engineers of Japan, Visual Computing, Devices & Communications, Jul. 25, 2009, vol. 38, No. 4, pp. 395-403, with English abstract.

(Continued)

*Primary Examiner* — David E Choi
(74) *Attorney, Agent, or Firm* — Carter, DeLuca & Farrell LLP (57) ABSTRACT

The image search system according to the present invention accumulates virtual viewpoint video image data generated based on image data obtained by capturing an object from a plurality of directions by a plurality of cameras and a virtual viewpoint parameter used for generation of the virtual viewpoint video image data in association with each other. Then, the image search system extracts, in a case where a search condition is input via an input unit, virtual viewpoint video image data associated with a virtual viewpoint parameter corresponding to the search condition from the accumulated virtual viewpoint video image data. Further, the image search system presents information of the extracted virtual viewpoint video image data as results of the search. Due to this, convenience relating to a search for a virtual viewpoint video image improves.

16 Claims, 9 Drawing Sheets

(56) References Cited

U.S. PATENT DOCUMENTS

| | | | |
|---|---|---|---|
| 2006/0256110 A1* | 11/2006 | Okuno | G06F 3/0346 |
| | | | 345/419 |
| 2008/0030461 A1* | 2/2008 | Matsui | G06F 3/011 |
| | | | 345/156 |
| 2008/0266416 A1* | 10/2008 | Kobayashi | G06T 7/73 |
| | | | 348/222.1 |
| 2012/0141016 A1* | 6/2012 | Wildeboer | H04N 13/271 |
| | | | 382/154 |
| 2015/0219239 A1 | 8/2015 | Zeiner | |
| 2016/0086386 A1* | 3/2016 | Son | G02B 27/017 |
| | | | 345/633 |
| 2018/0197342 A1* | 7/2018 | Kasahara | G06T 13/20 |
| 2019/0014301 A1 | 1/2019 | Ota | |
| 2019/0278803 A1* | 9/2019 | Ota | G06F 3/04847 |
| 2020/0036952 A1* | 1/2020 | Iwane | G06T 15/20 |

OTHER PUBLICATIONS

Notice of Reasons for Refusal issued by the Japan Patent Office dated Feb. 8, 2022 in corresponding JP Patent Application No. 2018-043458, with English translation.

\* cited by examiner

IMAGE SEARCH SYSTEM, IMAGE SEARCH METHOD AND STORAGE MEDIUM

CROSS REFERENCE TO RELATED APPLICATIONS

This application is a continuation of U.S. patent application Ser. No. 16/294,195, filed on Mar. 6, 2019, which claims the benefit of and priority to Japanese Patent Application No. 2018-043458, filed on Mar. 9, 2018, each of which is hereby incorporated by reference herein in their entirety.

BACKGROUND OF THE INVENTION

Field of the Invention

The present invention relates to an image search system for searching for a virtual viewpoint video image, an image search method, and a storage medium.

Description of the Related Art

In recent years, a technique has been attracting attention that generates a video image (virtual viewpoint video image) from an arbitrary virtual camera (virtual viewpoint) by installing a plurality of cameras at different positions to perform synchronous image capturing from a plurality of viewpoints and by using multi-viewpoint images obtained by the image capturing. According to the technique such as this, for example, it is made possible to view a highlight scene in soccer or basketball from a variety of angles, and therefore, it is made possible to give a user a high feeling of being at a live performance compared to the normal video image contents.

In a case of searching for a desired video image from a plurality of video images, it is possible to take information, such as a date of image capturing and a scene, as a search element. Japanese Patent Laid Open No. 2004-145564 has disclosed an apparatus that searches for a video image corresponding to a scene (for example, a scene in which a warning is detected) or a time zone specified by a user from video images captured by a plurality of cameras and presents the video image obtained by the search to the user.

According to the technique such as described above, there is a case where a plurality of virtual viewpoint video images whose viewpoints are different is generated for the same scene. Because of this, a case is expected where it is difficult to specify a desired virtual viewpoint video image from a plurality of virtual viewpoint video images even by specifying a date of image capturing or a scene as conventionally.

Consequently, an object of the present invention is to improve convenience relating to a search for a virtual viewpoint video image.

SUMMARY OF THE INVENTION

The image search system according to the present invention includes: an accumulation unit configured to accumulate virtual viewpoint video image data generated based on image data obtained by capturing an object from a plurality of directions by a plurality of cameras and a virtual viewpoint parameter used for generation of the virtual viewpoint video image data in association with each other; an input unit configured to input a search condition; an extraction unit configured to extract virtual viewpoint video image data associated with a virtual viewpoint parameter corresponding to the input search condition from the accumulation unit; and a presentation unit configured to present information of virtual viewpoint video image data extracted by the extraction unit as search results.

Further features of the present invention will become apparent from the following description of exemplary embodiments with reference to the attached drawings.

DESCRIPTION OF THE EMBODIMENTS

In the following, embodiments of the present invention are explained in detail. Components described in the following embodiments indicate aspects as examples of the present invention and are not intended to limit the scope of the present invention to those.

First Embodiment

Figure 1:
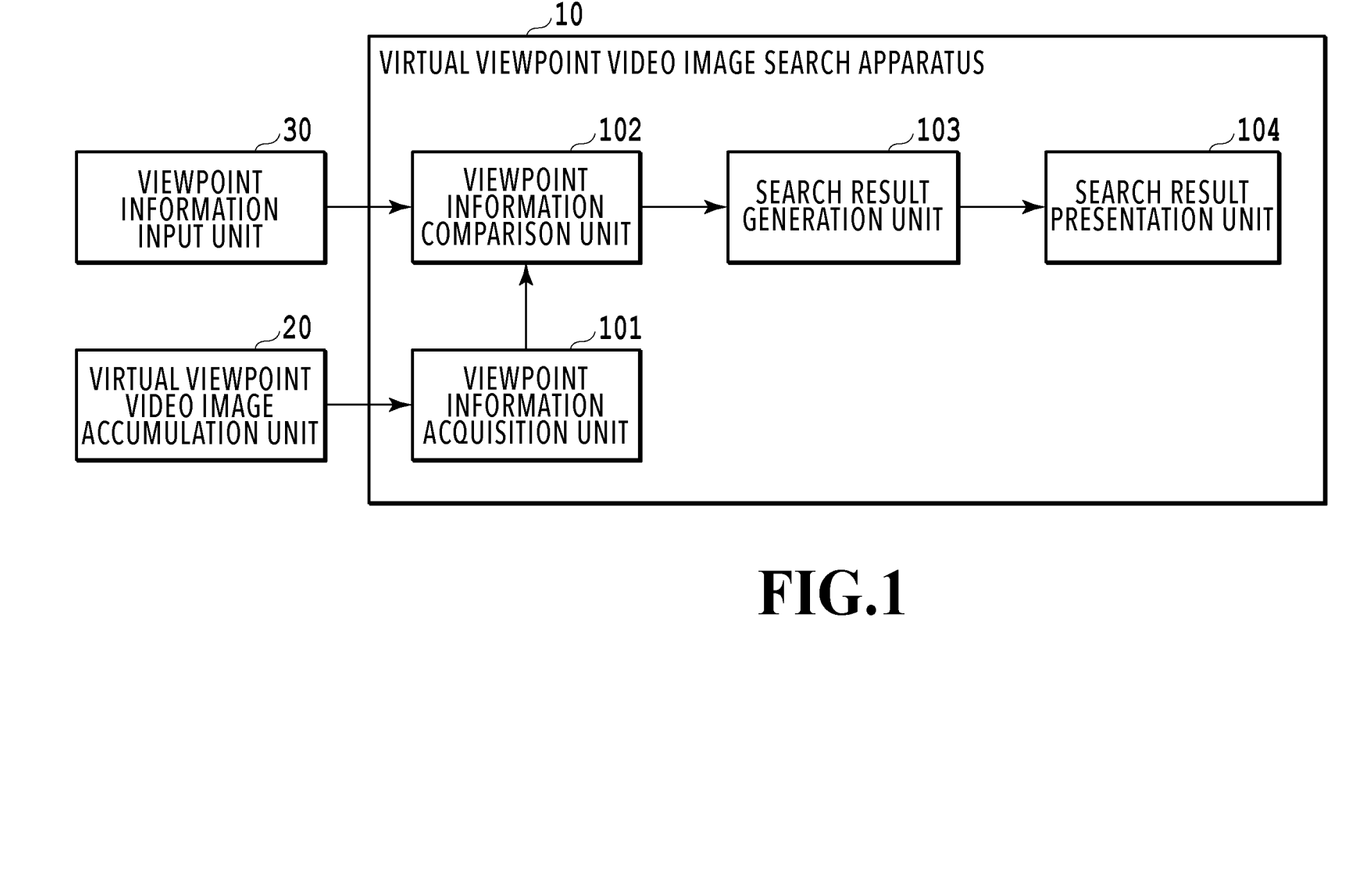
FIG. 1 is a block diagram showing an example of a configuration of an image search system in an embodiment.

FIG. 1 is a block diagram showing an example of a configuration of an image search system in a first embodiment. The image search system in the first embodiment includes a virtual viewpoint video image search apparatus (hereinafter, called an image search apparatus, or simply a search apparatus) 10 that searches for a virtual viewpoint video image as shown in FIG. 1. Further, the image search system includes a viewpoint information input unit 30 through which a user inputs viewpoint information and a virtual viewpoint video image accumulation unit (hereinafter, called simply an accumulation unit) 20 in which virtual viewpoint video image data indicating a virtual viewpoint video image is accumulated.

The search apparatus 10 is a computer, for example, such as a PC (Personal Computer), a WS (Work Station), and various servers. The computer may be a tablet PC or a smartphone. The search apparatus 10 performs characteristic processing of the present embodiment. Details of the processing of the search apparatus 10 will be described later by using FIG. 4.

The accumulation unit 20 accumulates one piece or a plurality of pieces of virtual viewpoint video image data. The accumulation unit 20 is, for example, a storage device, such as a hard disk drive (HDD), a solid state drive (SSD), and a flash memory. The accumulation unit 20 may be configured by a single device or may be configured by an aggregate of a plurality of devices, and there may be a plurality of kinds of device in a mixed manner. Further, the accumulation unit 20 may be configured by a device on a cloud virtualized on a network in place of a physical device. Furthermore, the virtual viewpoint video image data accumulated in the accumulation unit 20 may be generated by any generation unit. Still furthermore, the virtual viewpoint video image data may be accumulated in the accumulation unit 20 in any data format. However, it is assumed that viewpoint information is given to each piece of the virtual viewpoint video image data accumulated in the accumulation unit 20. Details of the data format of virtual viewpoint video image data accumulated in the accumulation unit 20 will be described later by using FIG. 2.

The search apparatus 10 and the accumulation unit 20 are connected via a network. In the present embodiment, as the network that connects the search apparatus 10 and the accumulation unit 20, Ethernet (registered trademark) is used, but another network may be used. Further, the search apparatus 10 and the accumulation unit 20 may be housed in the same casing. In such a case, it is assumed that the search apparatus 10 and the accumulation unit 20 are connected by an internal bus within a computer.

Figure 2:
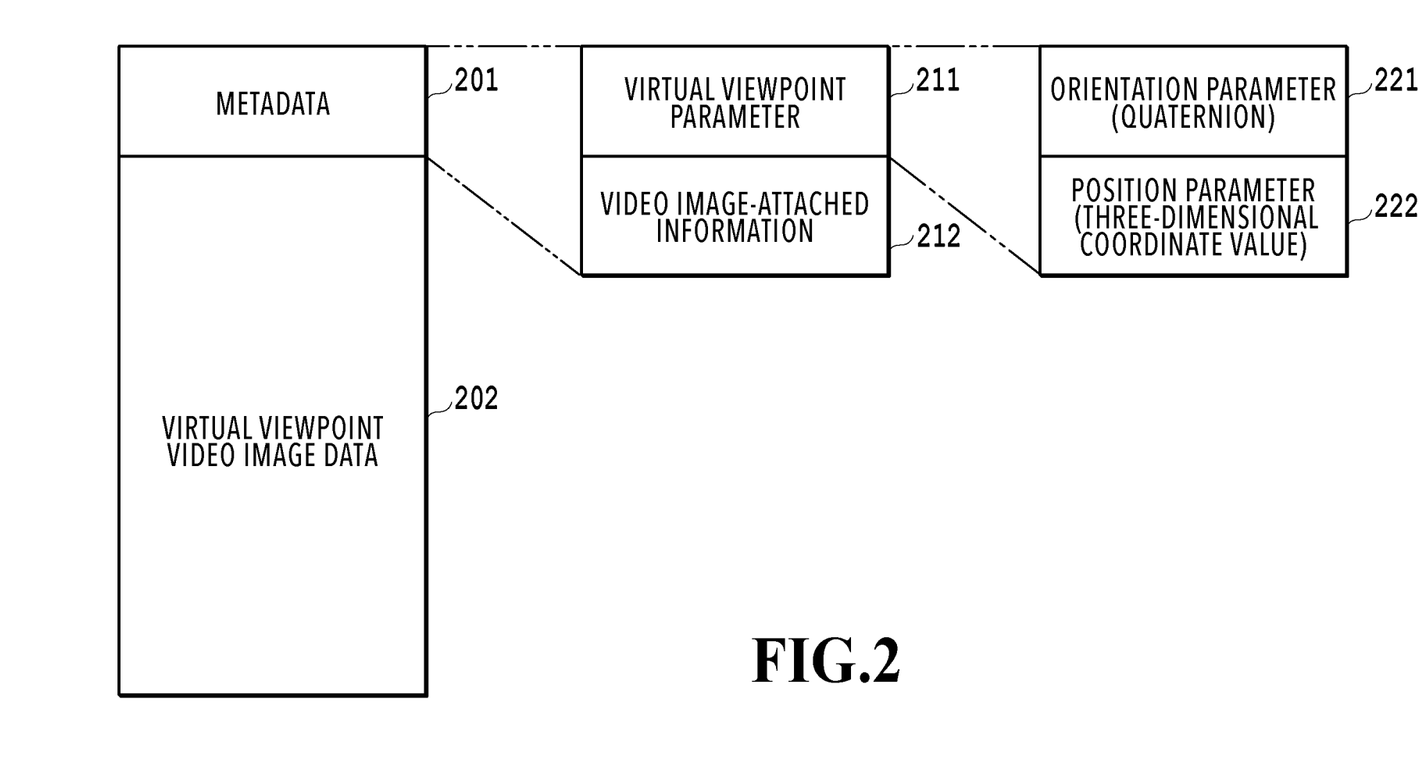
FIG. 2 is a diagram showing an example of a data format at the time of accumulating virtual viewpoint video image data in the embodiment.

FIG. 2 is a diagram showing an example of the data format of virtual viewpoint video image data accumulated in the accumulation unit 20 in the first embodiment. As shown in FIG. 2, virtual viewpoint video image data 202 in the present embodiment is stored in the accumulation unit 20 in a state where metadata 201 is given. The metadata 201 includes a virtual viewpoint parameter 211 and video image-attached information 212. As described above, in the present embodiment, it is assumed that the virtual viewpoint parameter 211 is given to the virtual viewpoint video image data 202 as viewpoint information. The data 201 and 202 are only required to be accumulated in association with each other and their arrangement and order are not limited to the aspect shown in FIG. 2. Further, the arrangement and order of the parameters and information within the metadata 201 are not limited to the aspect shown in FIG. 2.

The virtual viewpoint parameter 211 includes an orientation parameter 221 and a position parameter 222. Details of the virtual viewpoint parameter 211 will be described later. The video image-attached information 212 is metadata that is generally given to, for example, video image data, such as image capturing time information (hereinafter, described simply as time information), a resolution of a video image, and a color space. The time information is information indicating an image capturing time of a target virtual viewpoint video image, and more specifically, information indicating an image capturing time of a captured video image, which is the source of generation of the virtual viewpoint video image. The image capturing time may be an absolute time or a relative time with the image capturing start time being taken as 0. The image capturing time may be a time code, which is a general standard as the representation format of a relative time, or one similar thereto.

Here, the virtual viewpoint parameter 211 is explained. The orientation parameter 221 of the virtual viewpoint parameter 211 is a parameter indicating the orientation of a virtual camera. In the present embodiment, it is assumed that the orientation of a virtual camera is represented by a quaternion. The quaternion is represented by expression (1) below.

[Mathematical expression 1]

$$Q=(0;x,y,z) \quad (1)$$

In expression (1), the left side of the semicolon represents the real part and x, y, and z represent the imaginary part. By using the quaternion representation, it is made possible to easily represent arbitrary rotation with an arbitrary direction as an axis. Specifically, the procedure is as follows.

First, a point P desired to be rotated is expressed by expression (2) below.

[Mathematical expression 2]

$$P=(0;xp,yp,zp)=(0;Vp) \quad (2)$$

Next, a vector indicating the direction of the rotation axis is described as v=(xv, yv, zv) and a desired rotation angle is described as θ, and then, by using expression (3) and expression (4) below, two quaternions Q and R are found from this vector v. It is assumed that the vector v is normalized.

[Mathematical expression 3]

$$Q=(\cos(\theta/2);xv*\sin(\theta/2),yv*\sin(\theta/2),zv*\sin(\theta/2)) \quad (3)$$

[Mathematical expression 4]

$$R=(\cos(\theta/2);-xv*\sin(\theta/2),-yv*\sin(\theta/2),-zv*\sin(\theta/2)) \quad (4)$$

Lastly, an arithmetic operation as shown in expression (5) below is performed.

[Mathematical expression 5]

$$R*P*Q=(0;x,y,z) \quad (5)$$

As a result of this, a point that is the point P rotated by θ about the axis in the direction of the vector v is obtained as coordinates (x, y, z). The representation method of the orientation parameter 221 is not limited to this and for example, the representation method may be a rotation matrix presentation.

The position parameter 222 is a parameter indicating the position of a virtual camera. It is assumed that the three-dimensional coordinates are three-dimensional coordinates (x, y, z) with the origin on the world coordinates being taken to be (0, 0, 0). As described above, in the present embodiment, the position parameter 222 is represented by a three-dimensional vector.

In FIG. 2, the example in which the virtual viewpoint video image data 202 is stored in the data area continuous with the metadata 201 is shown, but the virtual viewpoint video image data 202 does not need to be stored in the data area continuous with the metadata 201. Further, the virtual viewpoint video image data 202 and the metadata 201 do not need to be stored within the same file and they may be stored in separate files, respectively.

In a case where the virtual viewpoint video image data 202 is a moving image, that is, a video image including a plurality of frames, it is assumed that the virtual viewpoint parameters 211 whose number is the same as the number of frames are given to the virtual viewpoint video image data 202. It may also be possible to give the typical virtual viewpoint parameter 211 to the virtual viewpoint video image data 202 irrespective of the number of frames. In such a case, the method of finding the typical value of the virtual viewpoint parameter 211 is not limited in particular. For example, it may also be possible to take the mean or the median of the virtual viewpoint parameters corresponding to all the frames as the typical value. Further, for example, it may also be possible to take a value specified by a user who has generated the virtual viewpoint video image data as the typical value.

Figure 3:
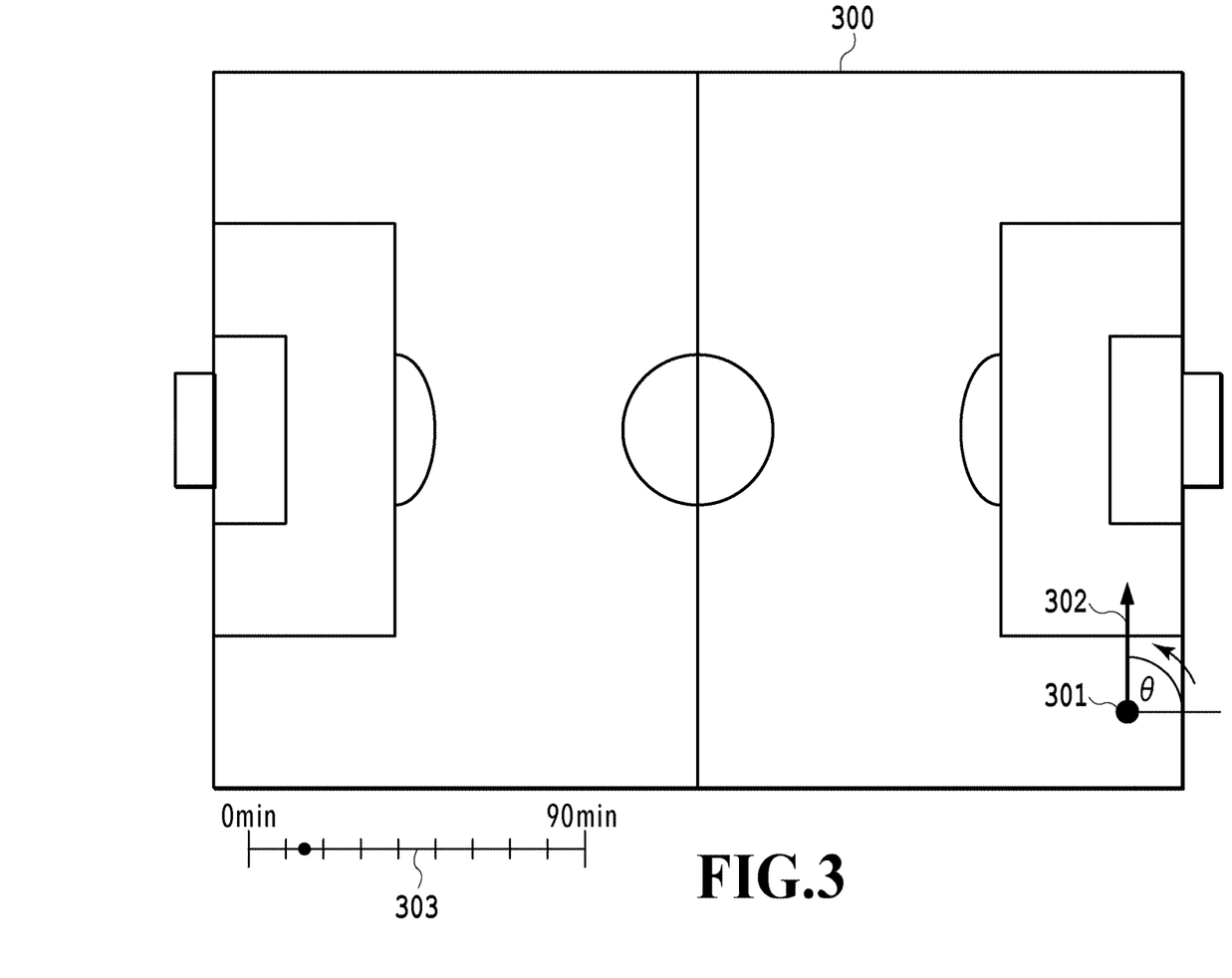
FIG. 3 is a diagram showing an example of a UI screen for a user to input viewpoint information.

The viewpoint information input unit 30 inputs viewpoint information. The viewpoint information that the viewpoint information input unit 30 inputs is information for searching for a virtual viewpoint video image. For example, the viewpoint information is the position of a virtual camera, to be described later. It is assumed that the viewpoint information input unit 30 in the present embodiment includes a display device, such as a liquid crystal display, having an input unit, such as a touch panel. The viewpoint information input unit 30 displays a user interface (UI) screen as shown in FIG. 3, to be described later. Then, a user specifies viewpoint information by performing an input operation, such as a touch operation, for the UI screen. The viewpoint information input unit 30 sends the viewpoint information specified by a user to the search apparatus 10 in the data format of the virtual viewpoint parameter 211 shown in FIG. 2. It may also be possible to configure the viewpoint information input unit 30 so as to be capable of receiving a signal from an input device, such as a mouse and a joystick.

FIG. 3 is a diagram showing an example of a UI screen for a user to input viewpoint information. On the UI screen shown in FIG. 3, an image in a case where a soccer ground 300 is viewed from a bird's eye (two-dimensional space information) is displayed and a user specifies viewpoint information for the two-dimensional space information.

First, a user specifies a desired viewpoint position by a cursor (for example, mouse pointer) by operating a touch panel or using an input device, such as a mouse and a joystick. It is assumed that the cursor is located at the center of the ground 300 in the initial state. In the example shown in FIG. 3, the cursor is moved to a position 301 at the bottom right of the ground 300 by a user operation.

In a case where a viewpoint position is settled, next, a user specifies an orientation. In the present embodiment, it is possible to specify an orientation by rotating an arrow 302 shown in FIG. 3. Here, the position 301 is represented two-dimensionally by (x, y). It is assumed that the orientation, that is, the direction of the arrow 302, is in the rightward direction (rightward direction in FIG. 3) in the initial state, and parallel to the lengthwise direction of the ground 300. FIG. 3 shows a state where a user specifies an orientation θ, that is, a state where the arrow 302 is rotated by 90 degrees in the counterclockwise direction from the initial state.

In view of the situation of a soccer game, the position (position 301) and the orientation (arrow 302) specified by a user on the UI screen shown in FIG. 3 correspond to a scene in which a team having invaded the opponent zone on the right side in FIG. 3 performs a centering kick, or the like. As specifying time information at the time of searching for normal moving image contents, in a case where the virtual viewpoint video image contents are moving image data including a plurality of frames, it is possible to specify a time by using a scale specification unit 303. It is possible for a user to specify time information by specifying the position of a button (black circle) on the scale specification unit 303. In the example shown in FIG. 3, a user selects a time about 15 minutes after the game starts. In the present embodiment, in order to make explanation easy, the case is taken as an example where a search is made on the image represented two-dimensionally, but it may also be possible to include the z-direction in a three-dimensional space, that is, the height direction in the physical space of the ground 300 in the search condition. That is, it may also be possible to enable a user to specify three-dimensional position and orientation. In such a case, as a UI that causes a user to specify a position and an orientation, a UI is supposed that presents a three-dimensional image (space information) to a user and causes a user to specify a position and an orientation. For example, a UI is supposed that displays the direction in which a user views on the screen of the viewpoint information input unit 30 on the assumption that the user exists on a target virtual space (virtual three-dimensional space) as performed in various 3D simulators or 3D games. By using such a UI, it is made possible for a user to easily specify desired position and orientation as a virtual viewpoint parameter by freely moving on a virtual space by operating a joystick or the like, by facing in a direction desired by a user to view on a virtual space, and so on.

The representation format of a UI that causes a user to specify a position and an orientation is not limited to the above-described example. For example, it may also be possible to adopt a UI capable of specifying a position and an orientation by specific numerical values by using a keyboard. Further, it may also be possible to adopt a UI that specifies a position and an orientation by combining a plurality of operation devices, such as a mouse and a joystick described above. Furthermore, it may also be possible to adopt an interface, such as one that presents a highlight scene, which is generally adopted at the time of searching for moving image contents in a moving image reproduction application. For example, it may also be possible to produce a display by overlapping a highlight scene in a time zone corresponding to a position at which a cursor is placed in a case where the cursor is placed on the scale specification unit 303 shown in FIG. 3. According to such an aspect, it is made possible for a user to grasp a time zone in which a specific event occurred while checking displayed highlight scenes. Consequently, it is made possible to specify a time zone around a time at which a specific event occurred in place of simply specifying a time.

It is not necessary to specify all the parameters of the orientation parameter, the position parameter, and the time information and it may also be possible to specify only one of the parameters or to specify a combination of any parameters. In addition, it may also be possible to make use of another piece of information included in the video image-attached information as a search condition, not limited to the time information. For example, it may also be possible to make use of information relating to the video image format, such as the color space and resolution. Further, for example, it may also be possible to make use of metadata indicating category information given at the time of generation of virtual viewpoint video image data. As the category information, information indicating the type of sport (soccer, rugby, and so on) and information indicating its sub category (corner kick, free kick, penalty kick, goal scene, and so on) are supposed. Further, it may also be possible to specify information relating to video image editing, such as fast forward and slow reproduction of frames, generally called a trick play. Furthermore, in a virtual viewpoint video image, a trick play called stop rotation exists, in which the viewpoint rotates around a subject (object) in the stationary state in a certain frame across a plurality of frames. It may also be possible to specify information relating to video image editing unique to the virtual viewpoint video image such as this as category information.

Further, as a parameter relating to a video image, there is an angle of view. For example, even in a case of two video images obtained by capturing a certain scene from the same viewpoint, there is a difference in how the video image is viewed between a telephoto video image that is caused to zoom in by focusing attention on a specific player and a wide-angle video image obtained by viewing the scene from a bird's eye. Consequently, it may also be possible to cause a user to specify angle-of-view information as a search condition by including the angle-of-view information in the virtual viewpoint parameter 211 or the video image-attached information 212. At this time, it may also be possible to cause a user to specify angle-of-view information categorized to a certain degree, such as "telephoto" and "wide-angle", or it may also be possible to cause a user to specify an arbitrary angle between 0 to 180 degrees as angle-of-view information. As a UI that causes a user to specify angle-of-view information, it may also be possible to adopt a UI capable of specifying angle-of-view information intuitively. For example, it may also be possible to enable specification of angle-of-view information in accordance with a field of view as a virtual viewpoint parameter by changing the field of view of a user on the virtual three-dimensional space as described previously.

It is assumed that the search apparatus 10 and the viewpoint information input unit 30 are connected via a network. In the present embodiment, as the network that connects the search apparatus 10 and the viewpoint information input unit 30, Ethernet (registered trademark) is used, but another network may be used. Further, the search apparatus 10 and the viewpoint information input unit 30 may be housed in the same casing. In such a case, it is assumed that the search apparatus 10 and the viewpoint information input unit 30 are connected by an internal bus within the computer.

Next, the configuration and the operation of the search apparatus 10 are explained. As shown in FIG. 1, the search apparatus 10 has a viewpoint information acquisition unit 101, a viewpoint information comparison unit 102, a search result generation unit 103, and a search result presentation unit 104. The viewpoint information acquisition unit 101 acquires the virtual viewpoint parameter 211 and the video image-attached information 212, both given to the virtual viewpoint video image data accumulated in the accumulation unit 20, from the accumulation unit 20. The viewpoint information comparison unit 102 compares the virtual viewpoint parameter received from the viewpoint information input unit 30 with the virtual viewpoint parameter received from the viewpoint information acquisition unit 101. The search result generation unit 103 generates search results from the comparison results of the viewpoint information comparison unit 102. The search result presentation unit 104 presents the search results received from the search result generation unit 103 to a user.

Figure 4:
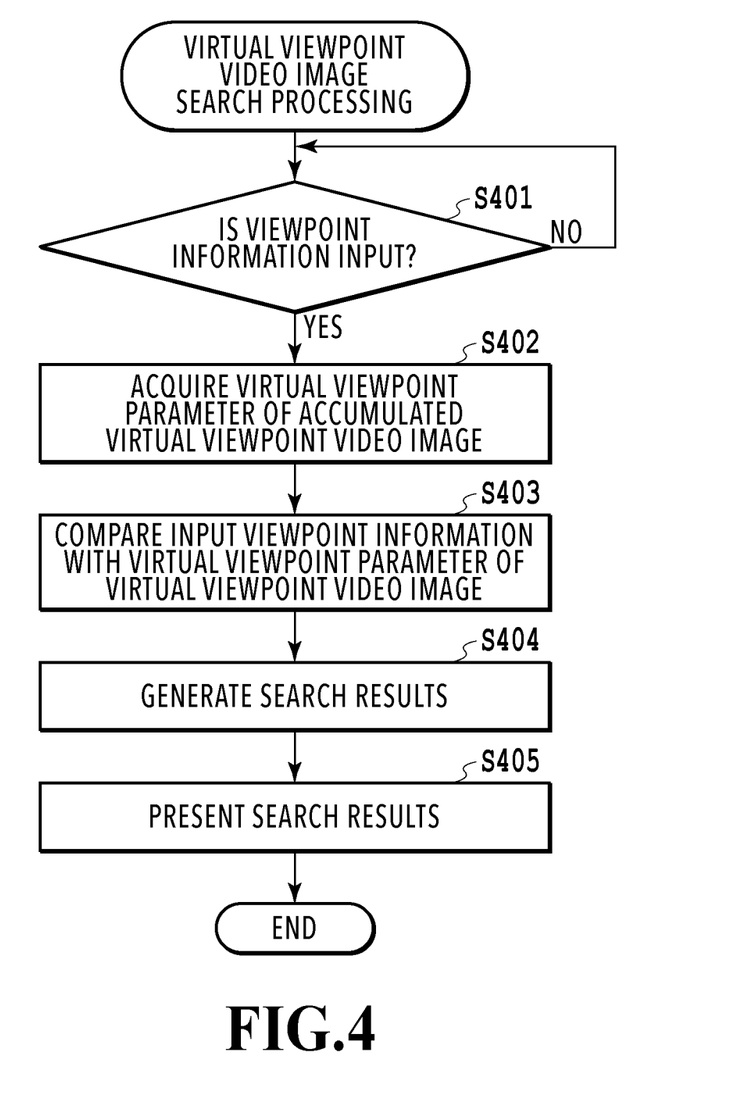
FIG. 4 is a flowchart showing search processing of a virtual viewpoint video image in the embodiment.

Here, by using FIG. 4, search processing of a virtual viewpoint video image in the search apparatus 10 is explained. FIG. 4 is a flowchart showing the search processing of a virtual viewpoint video image in the search apparatus 10 of the first embodiment. The series of processing in the flowchart shown in FIG. 4 is performed by, for example, the CPU (not shown schematically) of the search apparatus 10 loading program codes stored in the ROM (not shown schematically) onto the RAM (not shown schematically) and executing the program codes. Further, for example, it may also be possible to implement part or all of the steps in FIG. 4 by hardware, such as an ASIC and an electronic circuit.

At step S401 (hereinafter, simply described as S401 and the other steps are similarly described), the viewpoint information input unit 30 monitors whether a user inputs viewpoint information. In a case where viewpoint information is input (YES at S401), the viewpoint information input unit 30 delivers the input viewpoint information to the viewpoint information comparison unit 102. Here, it is assumed that time information is input as well as viewpoint information. Consequently, the viewpoint information input unit 30 delivers also the input time information to the viewpoint information comparison unit 102 and the processing advances to S402. In a case where no viewpoint information is input (NO at S401), the processing returns to S401.

At S402, the viewpoint information acquisition unit 101 acquires the virtual viewpoint parameter 211 and the video image-attached information 212, both given to the virtual viewpoint video image data accumulated in the accumulation unit 20, from the accumulation unit 20. Here, it is assumed that at least time information is acquired as the video image-attached information 212. Then, the viewpoint information acquisition unit 101 delivers the acquired virtual viewpoint parameter 211 and time information to the viewpoint information comparison unit 102.

At S403, the viewpoint information comparison unit 102 compares the viewpoint information and the time information received from the viewpoint information input unit 30 with the virtual viewpoint parameter 211 and the time information received from the viewpoint information acquisition unit 101. At step 404, the search result generation unit 103 generates search results from the comparison results of the viewpoint information comparison unit 102. At S405, the search result presentation unit 104 displays the search results received from the search result generation unit 103 on the liquid crystal display or the like of the viewpoint information input unit 30.

Figure 5:
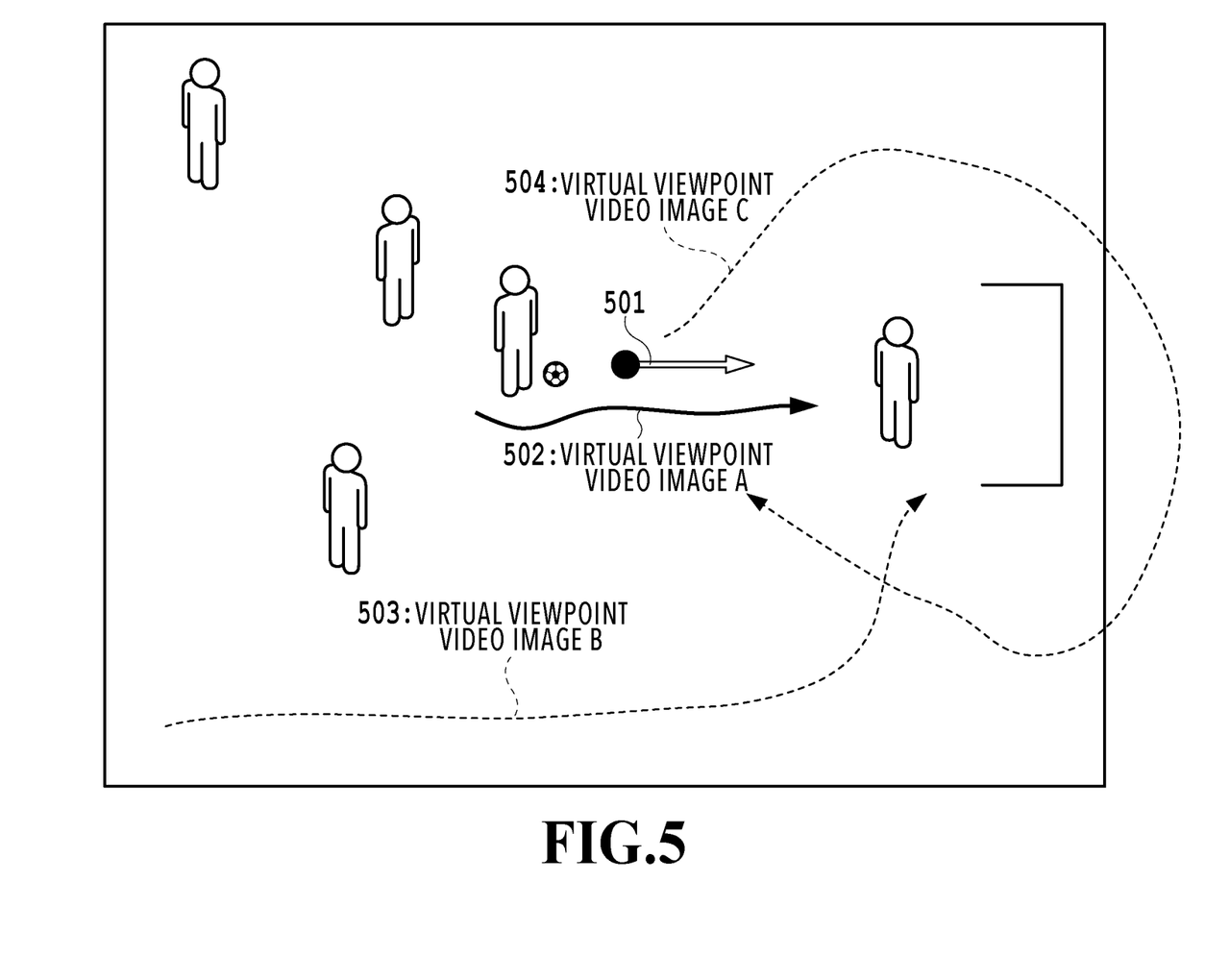
FIG. 5 is a diagram for explaining search processing in the embodiment.

Next, by using a specific example, the comparison processing at S403, the generation processing of search results at S404, and the presentation processing of search results at S405 described above, are explained. FIG. 5 is a diagram for explaining the search processing in the first embodiment. Here, it is assumed that virtual viewpoint video images A, B, and C generated for one scene in a certain soccer game are accumulated in the accumulation unit 20. In FIG. 5, camera paths corresponding to the above-described virtual viewpoint video images A, B, and C are indicated schematically by arrow lines 502, 503, and 504. The start point of the arrow line indicates the start point of the camera path (first frame) and the tip of the arrow line indicates the endpoint of the camera path (last frame). The camera path is a path obtained by causing the virtual viewpoint parameters to continue in the number corresponding to the number of image frames and indicates a path of the virtual viewpoint. As in the case with the stop rotation described previously, in a case where video image editing in which a plurality of frames whose time is the same is generated is performed, virtual viewpoint video image data whose number of image frames does not coincide with the number of actual time frames may be generated. However, it is also possible to similarly represent the virtual viewpoint video image indicated by the virtual viewpoint video image data such as this by a camera path. An outline arrow 501 (hereinafter, described as virtual viewpoint input 501) schematically indicates viewpoint information specified by a user as a search condition on the UI screen shown in FIG. 3.

The search condition (position of the virtual camera indicated by the virtual viewpoint input 501) specified by a user is compared with the position parameter 222 of each of the virtual viewpoint video images A, B, and C in the processing at S403 described above. Then, the mean of the position parameter 222 of the virtual viewpoint video image A is the nearest to the virtual viewpoint input 501, and therefore, the virtual viewpoint video image A is presented as the search results.

The position parameter 222 is represented by a three-dimensional vector, and therefore, the mean of the position parameter 222 is calculated as the mean of the vector indicating the position of the virtual camera in each frame of the virtual viewpoint video image. Each element of the vector is the coordinate value of each of the axes perpendicular to one another, and therefore, the mean of the position parameter 222 is the mean of each coordinate as a result. Further, it is assumed that in a case where the difference between the mean calculated for a certain virtual viewpoint video image and the virtual viewpoint input 501 specified by a user is less than or equal to a threshold value determined in advance, that is, the mean calculated for the certain virtual viewpoint video image and the virtual viewpoint input 501 are similar, information on the virtual viewpoint video image is presented to a user as the search results. The value used for the comparison processing at S403 is not limited to the mean and the median of the position parameter 222 or a value whose frequency is high may be used. Further, it may also be possible to use the orientation parameter 221 for the comparison processing at S403 in place of the position parameter 222, or to use both the position parameter 222 and the orientation parameter 221. It may also be possible to add and use time information for the comparison processing at S403. Further, it may also be possible to further narrow the search results, which are obtained by making a search by using one of the position parameter 222 and the orientation parameter 221, by using the other parameter. Furthermore, it may also be possible to use time information to narrow the search results. It may be possible to determine the similarity of the orientation parameter 221 by the inner product value of common vectors. It may also be possible to determine the similarity of the orientation parameter 221 by using a measure other than the inner product value. Further, it may also be possible to enable a user to set a threshold value of the position parameter 222 and the orientation parameter 221 at the time of performing the comparison processing at S403. Furthermore, it may also be possible to present a predetermined number of virtual viewpoint video images in the order from the virtual viewpoint video image whose degree of similarity is the highest as the search results.

As above, according to the present embodiment, by specifying viewpoint information, it is made possible for a user to search for a desired virtual viewpoint video image. Consequently, it becomes no longer necessary for a user to search for a desired virtual viewpoint video image while viewing virtual viewpoint video images one by one, which are indicated by the virtual viewpoint video image data accumulated in the accumulation unit 20. Consequently, even in a case where a vast amount of virtual viewpoint video image data is accumulated in the accumulation unit 20, it is made possible to easily extract a desired virtual viewpoint video image. Further, it is made possible to reduce the search time required at the time of searching for a desired virtual viewpoint video image.

The present embodiment is effective also in a case where a user him/herself tries to generate desired virtual viewpoint video image data. The reason is that in a case where desired virtual viewpoint video image data is accumulated in the accumulation unit 20, it is possible for a user to acquire the desired virtual viewpoint video image data from the accumulation unit 20. Consequently, according to the present embodiment, it is possible for a user to save time and effort required for generating desired virtual viewpoint video image data.

In the present embodiment, the case where the virtual viewpoint video image is a moving image is explained as an example, but it is possible to apply the present embodiment also to a case where the virtual viewpoint video image includes only one frame, that is, a case where the virtual viewpoint video image is a still image.

In the present embodiment, the apparatus that searches for a desired virtual viewpoint video image by using the virtual viewpoint parameter 211 is taken as an example. However, it may also be possible to use the virtual viewpoint parameter 211 for another purpose. For example, in a reproduction apparatus of a virtual viewpoint video image, it may also be possible to display information derived from the virtual viewpoint parameter along with the virtual viewpoint video image at the time of reproduction by using the virtual viewpoint parameter given to the virtual viewpoint video image data.

It may also be possible for a user to be capable of specifying which of the mean, the median, and another typical value to use for the comparison processing at S403. For example, it may also be possible to provide a "mean search" button, a "median search" button, or the like on the UI screen shown in FIG. 3. Then, it may also be possible to configure the present embodiment so that in a case where the "mean search" button is pressed down, the comparison processing using the mean is performed at S403 and in a case where the "median search" button is pressed down, the comparison processing using the median is performed at S403.

Further, the search results may be presented as character information, or the search results may be displayed as an image by some method. For example, it may also be possible to present the image (image in which camera paths are drawn on the image including objects) as shown in FIG. 5 as the search results. Furthermore, in a case where an image is displayed as the search results, it may also be possible to select and display a typical frame by some method. For example, it may also be possible to adopt a presentation method of the search results of a still image or a moving image, which is generally used in a moving image reproduction application, such as repeatedly displaying frames in a time zone, which is a highlight, and selecting and displaying a frame whose degree of coincidence with a search condition is easy to understand. The presentation method of the search results may be one other than the above-described display method or may be a presentation method by other than a display.

Second Embodiment

Figure 6:
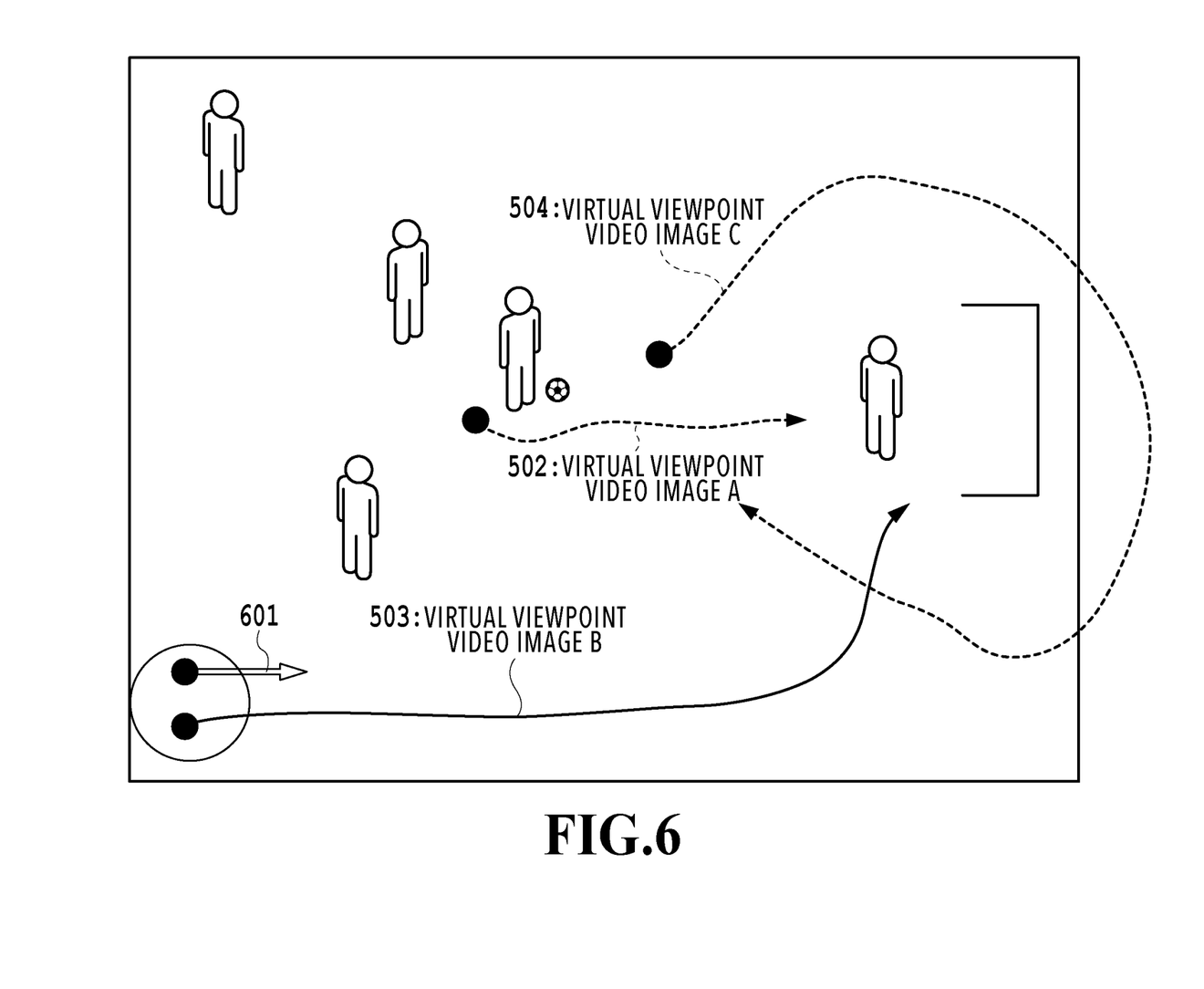
FIG. 6 is a diagram for explaining search processing in the embodiment.
Figure 7:
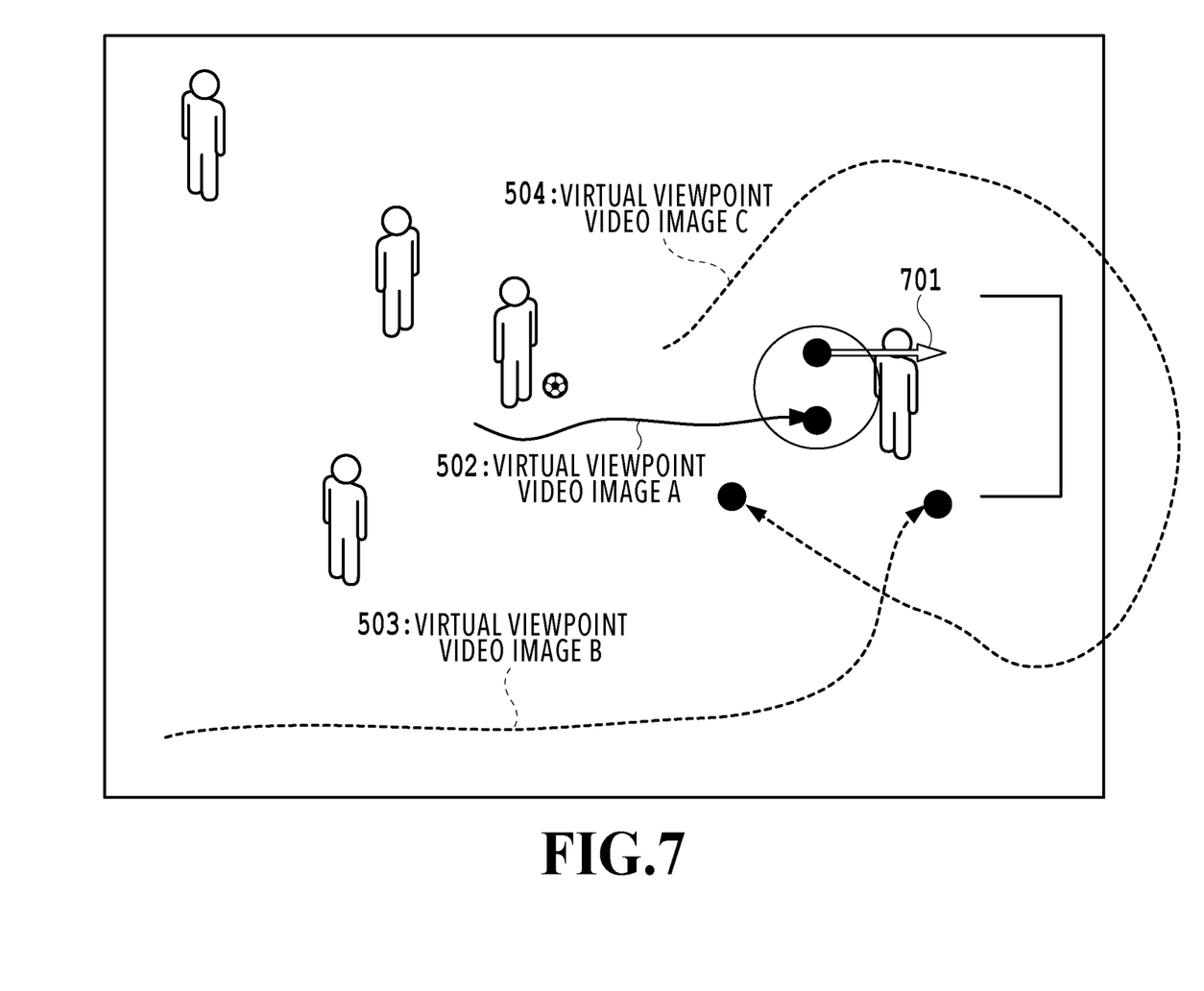
FIG. 7 is a diagram for explaining search processing in the embodiment.
Figure 8:
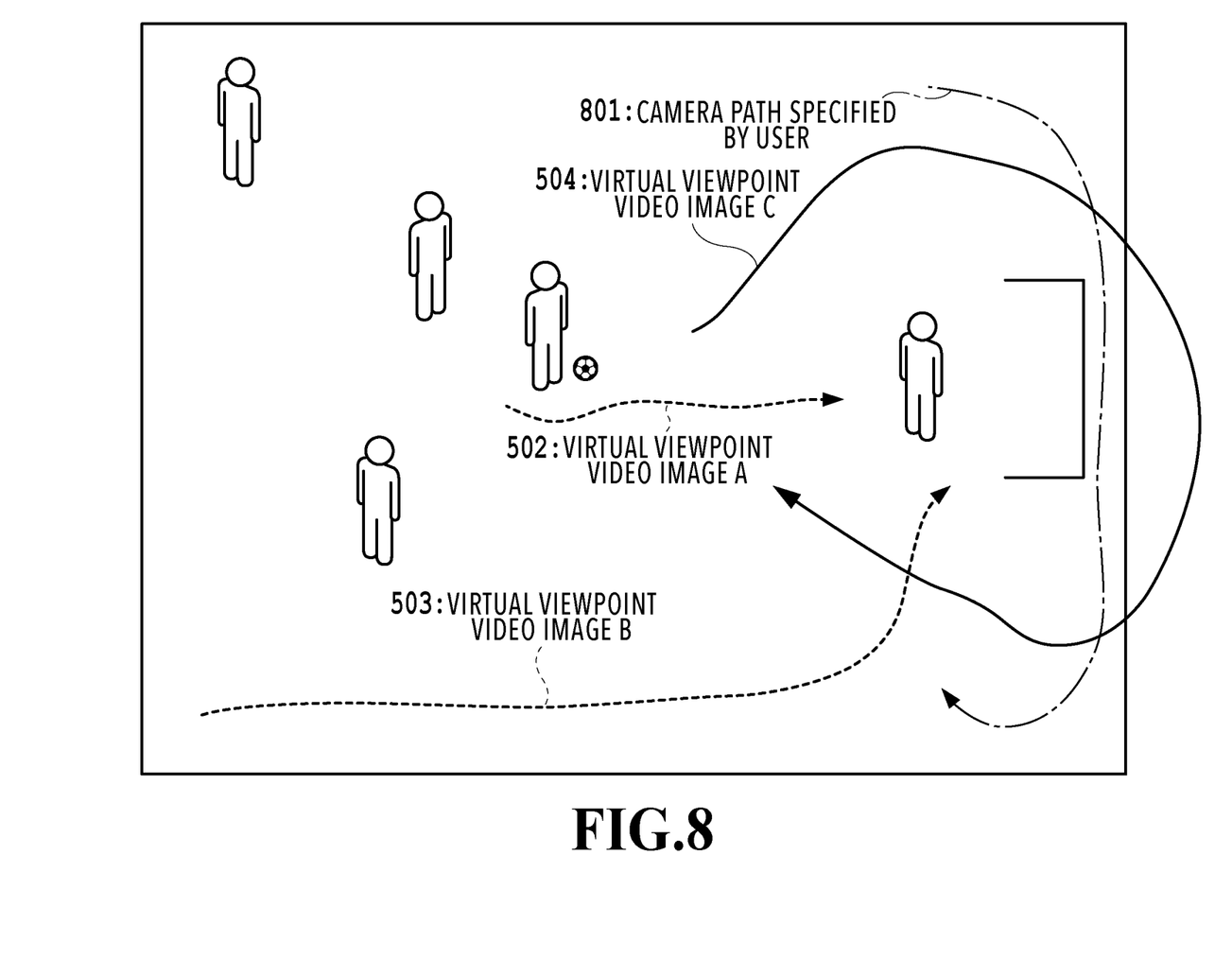
FIG. 8 is a diagram for explaining search processing in the embodiment.

In a second embodiment, an example is explained in which whether or not a virtual viewpoint video image is a virtual viewpoint video image desired by a user is determined by referring to part of the camera path of the virtual viewpoint video image accumulated in the accumulation unit 20. The configuration and operation of an image search system in the second embodiment are the same as the configuration and operation of the first embodiment. However, processing of the viewpoint information comparison unit 102 and the search result generation unit 103 is different. In the following, the processing of the viewpoint information comparison unit 102 and the search result generation unit 103 in the second embodiment is explained. FIG. 6 to FIG. 9 are diagrams for explaining search processing in the second embodiment. The virtual viewpoint video images A, B, and C shown in FIG. 6 to FIG. 8 are the same as the virtual viewpoint video images A, B, and C shown in FIG. 5, and therefore, the same symbol is attached to each virtual viewpoint video image.

First, by using FIG. 6, the search processing to determine whether or not each virtual viewpoint video image is a virtual viewpoint video image desired by a user by referring to the start points of the camera paths of the virtual viewpoint video images A, B, and C is explained. An outline arrow 601 (hereinafter, described as a virtual viewpoint input 601) shown in FIG. 6 schematically indicates viewpoint information specified by a user as a search condition on the UI screen shown in FIG. 3. Here, it is assumed that the search condition (position and orientation of the virtual camera indicated by the virtual viewpoint input 601) specified by a user is compared with the position parameter 222 and the orientation parameter 221 of the first frame of each virtual viewpoint video image in the above-described processing at S403. FIG. 6 shows the way the virtual viewpoint video image B indicated by a solid line is extracted as results of the search. A circular frame enclosing the start point (black circle) of the virtual viewpoint input 601 and the start point (black circle) of the virtual viewpoint video image B in FIG. 6 indicates that a search is made by referring to the start point of the camera path. As described above, the virtual viewpoint input 601 is used as the condition for searching for a "virtual viewpoint video image that starts from a specified frame", different from the virtual viewpoint input 501 in FIG. 5.

Next, by using FIG. 7, the search processing to determine whether or not a virtual viewpoint video image is a virtual viewpoint video image desired by a user by referring to the endpoints of the camera paths of the virtual viewpoint video images A, B, and C is explained. An outline arrow 701 (hereinafter, described as a virtual viewpoint input 701) shown in FIG. 7 schematically indicates viewpoint information specified by a user as a search condition on the UI screen shown in FIG. 3. Here, it is assumed that the search condition (position and orientation of the virtual camera indicated by the virtual viewpoint input 701) specified by a user is compared with the position parameter 222 and the orientation parameter 221 of the last frame of each virtual viewpoint video image in the above-described processing at S403. FIG. 7 shows the way the virtual viewpoint video image A indicated by a solid line is extracted as results of the search. A circular frame enclosing the start point (black circle) of the virtual viewpoint input 701 and the endpoint (black circle) of the virtual viewpoint video image A in FIG. 7 indicates that a search is made by referring to the endpoint of the camera path. Due to this, it is possible for a user to recognize that the virtual viewpoint video image A is a virtual viewpoint video image that ends in a frame having the position parameter and the orientation parameter that coincide with or resemble the search condition. As described above, the virtual viewpoint input 701 is used as the condition for searching for a "virtual viewpoint video image that ends in a specified frame", different from the virtual viewpoint input 501 in FIG. 5.

As in the examples shown in FIG. 6 and FIG. 7, by taking part of the camera paths of the virtual viewpoint video images A, B, and C as a search target, it is made possible to extract a virtual viewpoint video image whose virtual viewpoint parameter of part of the frames (here, the first or last frame) coincides with or resembles the search condition. It may be possible to perform the calculation processing of similarity with the search condition and the comparison processing using the similarity as in the first embodiment.

Next, by using FIG. 8, an example is explained in which a user specifies a camera path as a search condition. A one-dot chain arrow line 801 (hereinafter, described as a camera path 801) shown in FIG. 8 schematically shows viewpoint information specified by a user as a search condition on the UI screen shown in FIG. 3. As the specification method of a camera path, for example, a method is supposed in which viewpoint information corresponding to the camera path 801, that is, continuous viewpoint information is input to the viewpoint information input unit 30. Further, as the UI for specifying a camera path, for example, a UI is supposed in which a cursor is moved from the start point to the endpoint on an image obtained by capturing a soccer ground from a bird's eye and the locus is specified as a camera path. In such a UI, the coordinates (x, y) of each position on the specified camera path are input to the viewpoint information input unit 30 as viewpoint information (position of the virtual camera). It may be possible to input the orientation of the virtual camera separately to the viewpoint information input unit 30 after specifying the camera path. As the determination method of the orientation of a virtual camera, a method of specifying a fixed position as a gaze point is supposed as the simplest method. In a case where a fixed position is specified as a gaze point, the orientation of a virtual camera is determined so that the virtual camera faces the gaze point at each position in the camera path.

Further, in a case where it is desired to specify a camera path whose degree of freedom is higher, it may also be possible to input the orientation at the same time as inputting the position of the virtual camera. Specifically, as described in the explanation of the first embodiment, it may also be possible to acquire the viewpoint of a user on the three-dimensional space as viewpoint information. For example, a method of acquiring the position of the virtual camera and the direction (orientation) of the virtual camera as viewpoint information by actually moving the virtual camera in the soccer stadium represented on the virtual three-dimensional space is supposed.

In the above-described processing at S403, the camera path specified by a user is compared with each camera path of the virtual viewpoint video images A, B, and C. In the example shown in FIG. 8, the virtual viewpoint video image C having the camera path most resembling the camera path 801 specified by a user is extracted. As described above, the camera path consists of a plurality of continuous virtual viewpoint parameters. Consequently, in the example shown in FIG. 8, in the processing at S403, between the camera path 801 specified by a user and the camera paths of the virtual viewpoint video images A, B, and C, the virtual viewpoint parameters whose image capturing time is the same are compared. The image capturing time may be an absolute time or a relative time. Further, the comparison between the orientation parameters may be performed at the same time as the comparison between the position parameters, or after the comparison between the position parameters in order to narrow the candidates obtained by the search by the position parameter. It may also be possible to find, for the camera including the continuous virtual viewpoint parameters, the mean or the median of the virtual viewpoint parameters as a typical value and to use the typical value for the search processing. That is, it may also be possible to compare the mean or the media of the camera path 801 with the mean or the median of the camera paths of the virtual viewpoint video images A, B, and C.

As in the example shown in FIG. 8, by specifying the camera path as the search condition, it is made possible to implement a search for a virtual viewpoint video image in view of a transition of the virtual viewpoint parameter, that is, a transition of the viewpoint.

Figure 9:
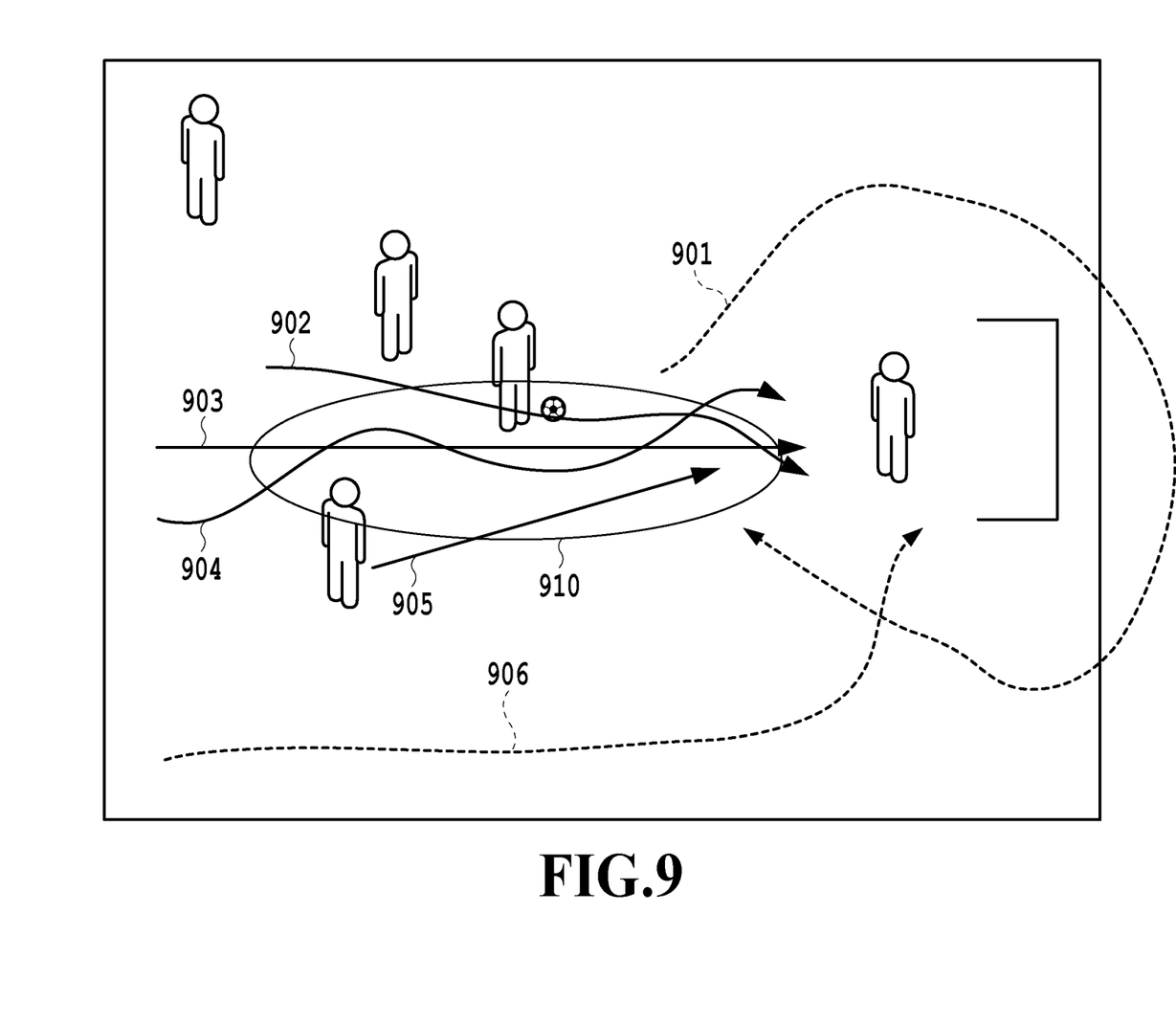
FIG. 9 is a diagram for explaining search processing in the embodiment.

Lastly, by using FIG. 9, an example is explained in which search processing is performed without specifying a search condition. Here, it is assumed that virtual viewpoint video image data generated for a specific scene is accumulated in the accumulation unit 20. FIG. 9 schematically shows camera paths of virtual viewpoint video images 901 to 906 indicated by the above-described virtual viewpoint video image data. For example, it is assumed that a "Frequently viewed viewpoint" button, not shown schematically, is provided on the UI screen shown in FIG. 3 and setting that no search condition is specified is set by a user pressing down the button. At this time, instructions to make a search by the frequency of the virtual viewpoint parameter are sent from the viewpoint information input unit 30 to the viewpoint information acquisition unit 101 and all the virtual viewpoint parameters of the virtual viewpoint video images 901 to 906 are analyzed by the viewpoint information comparison unit 102.

The viewpoint information comparison unit 102 derives the frequencies of the orientation parameter 221 and the position parameter 222 of all the frames of each of the virtual viewpoint video images 901 to 906 and performs grouping of the virtual viewpoint video images 901 to 906 based on the derived frequencies. At this time, it may also be possible to derive the frequency by using only the orientation parameter 221, or only the position parameter 222, or both the parameters. Further, it may also be possible to perform grouping by using another parameter, for example, the video image-attached information 212. It may also be possible to use the mean or the median of the orientation parameter 221 or the position parameter 222 in place of using the parameters of all the frames, or to use a typical value set in advance.

In a case where the orientation parameter 221 and the position parameter 222 are handled together for all the frames, it is possible to regard the orientation parameter 221 and the position parameter 222 as being an aggregate of vectors having each parameter as an element. Consequently, for grouping of the virtual viewpoint video images, it is possible to use a method used for similarity comparison, clustering, grouping, categorization, and so on of common vectors. Specifically, it is supposed to use the k-means clustering, the cosine similarity, the correlation coefficient, and so on. Further, it is also possible to grasp continuous virtual viewpoint parameters as a set of values in place of vectors. Consequently, it may also be possible to perform grouping by using the method of similarity calculation or grouping as a set. For example, a method that uses the Jaccard coefficient, the Dice coefficient, or the like is supposed.

An elliptic frame 910 shown in FIG. 9 schematically indicates a group of virtual viewpoint video images extracted as the results of the search. In the example shown in FIG. 9, as the results of the search by the frequency of the virtual viewpoint parameter, the virtual viewpoint video images 902, 903, 904, and 905 enclosed by the frame 910 are extracted as the virtual viewpoint video image given the virtual viewpoint parameter whose frequency is high. By deriving the frequency of the virtual viewpoint parameter specified for each virtual viewpoint video image as described above, it is made possible to extract the virtual viewpoint video image given the virtual viewpoint parameter whose frequency is high. The virtual viewpoint parameter whose frequency is high is, for example, a virtual viewpoint parameter whose frequency is higher than or equal to a predetermined value. By the search processing as shown in FIG. 9, it is possible to specify a virtual viewpoint parameter or a camera path used frequently in a specific scene, and therefore, it is made possible to extract a virtual viewpoint video image for which a specified virtual viewpoint parameter or camera path is set.

Due to this, it is made possible to extract a virtual viewpoint video image of a viewpoint or a camera path, from or through which a scene is viewed frequently, from a plurality of virtual viewpoint video images generated for a specific scene. It is supposed that the virtual viewpoint video image thus extracted is a video image generated from a viewpoint or through a camera path capable of representing the specific scene in an easy-to-understand manner, or a video image generated from a viewpoint or through a camera path that gives a strong impression to a viewing user as a video image representation. Consequently, the search processing as shown in FIG. 9 is effective at the time of searching for a virtual viewpoint video image from a viewpoint or through a camera path, from or through which a scene is viewed frequently.

Further, the search processing as shown in FIG. 9 is also effective at the time of searching for a similar virtual viewpoint video image. For example, the search apparatus 10 compares the orientation parameter or the position parameter between the virtual viewpoint video image specified by a user and the virtual viewpoint video image indicated by each piece of virtual viewpoint video image data accumulated in the accumulation unit 20. Then, it is made possible to present the similarity between the virtual viewpoint video image specified by a user and the virtual viewpoint video image indicated by each piece of virtual viewpoint video image data accumulated in the accumulation unit 20 to a user in accordance with the results of the comparison, to present the virtual viewpoint video images in the descending order of similarity to a user, and so on.

Further, it may be possible to present the search results obtained by each piece of search processing explained by using FIG. 6 to FIG. 9 by using the presentation method explained in the first embodiment.

In each embodiment described above, the case is taken as an example where information indicating the position, orientation, and angle of view of a virtual camera is stored in the virtual viewpoint parameter. However, it may also be possible to store another piece of information in the virtual viewpoint parameter. For example, it may also be possible to store identification information on a user who has set the virtual viewpoint (user name and the like), the date of setting of the virtual viewpoint, the date of generation of the virtual viewpoint video image, and so on, in the virtual viewpoint parameter. Further, for example, it may also be possible to store information relating to the codec of the virtual viewpoint video image and information relating to the movement distance of the virtual viewpoint in the virtual viewpoint parameter. Still furthermore, for example, it may also be possible to store information relating to the reproduction time of the virtual viewpoint video image and information relating to the limit to reproduction of the virtual viewpoint video image (identification information on a user who can reproduce, information relating to the number of times reproduction can be performed, and so on) in the virtual viewpoint parameter. By storing those pieces of information in the virtual viewpoint parameter, it is made possible to search for virtual viewpoint video image data more sophisticatedly or more flexibly from the virtual viewpoint video image data group stored in the storage device or the like. Further, in addition to search, for example, it is made possible to select recommended contents, to rearrange the contents list, to use the virtual viewpoint parameter to check the individual file (for example, to refer to properties in a case where it is desired to remember the date at which the virtual viewpoint was set), and so on.

The configuration of the image search system is not limited to that shown in FIG. 1. For example, the search apparatus 10, the viewpoint information input unit 30, and the accumulation unit 20 may be connected with one another via a communication network (for example, the internet). For example, it is possible for the viewpoint information input unit 30 (smartphone) to receive a user operation relating to a search condition of a virtual viewpoint video image, to identify a virtual viewpoint parameter based on the user operation, and to transmit a search message based on the virtual viewpoint parameter to the search apparatus 10. Then, the search apparatus 10 performs search processing based on the search message from the viewpoint information input unit 30. The specific search method is the same as described above. Then, it is possible for the search apparatus 10 to transmit the results of the search processing to the viewpoint information input unit 30. In this case, in the viewpoint information input unit 30, the results of the search are presented. In the above-described embodiment, the example of the case is explained mainly where the search apparatus 10 and the accumulation unit 20 are separate from each other, but it may also be possible to implement those functions by one apparatus. As described above, it should be noted that there are various modification examples of the configuration in FIG. 1 and the distribution of functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to improve convenience relating to a search for a virtual viewpoint video image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-043458, filed Mar. 9, 2018 which is hereby incorporated by reference wherein in its entirety.

What is claimed is:

1. An image search system comprising:
one or more hardware processors; and
one or more memories storing one or more programs configured to be executed by the one or more hardware processors, the one or more programs including instructions for:
receiving a search instruction, which includes viewpoint information for specifying a virtual viewpoint parameter representing at least one of a position of a virtual viewpoint and a view orientation from the virtual viewpoint, by a user;
specifying, according to a predetermined condition, one or more virtual viewpoint images which have been generated and include at least a virtual viewpoint image corresponding to a virtual viewpoint parameter closest to the virtual viewpoint parameter specified by the viewpoint information included in the received search instruction; and
causing a display device to display the specified one or more virtual viewpoint image.

2. The image search system according to claim 1, wherein the virtual viewpoint image includes a plurality of frames, and
each frame included in the virtual viewpoint image is associated with the virtual viewpoint parameter.

3. The image search system according to claim 2, wherein a part or all of the plurality of frames are associated with time information corresponding to a same time.

4. The image search system according to claim 2, wherein one or more virtual viewpoint images, that include at least a virtual viewpoint image corresponding to a typical value which is based on the virtual viewpoint parameter associated with each frame included in the virtual viewpoint image and is closest to the virtual viewpoint parameter specified by the viewpoint information included in the received search instruction, are specified.

5. The image search system according to claim 4, wherein the typical value is a mean or a median of a value of a virtual viewpoint parameter associated with each frame included in the virtual viewpoint image.

6. The image search system according to claim 2, wherein one or more virtual viewpoint images, that include a frame associated with a virtual viewpoint parameter closest to the virtual viewpoint parameter specified by the viewpoint information included in the received search instruction, are specified.

7. The image search system according to claim 6, wherein one or more virtual viewpoint images, that include a first frame associated with a virtual viewpoint parameter closest to the virtual viewpoint parameter specified by the viewpoint information included in the received search instruction, are specified.

8. The image search system according to claim 6, wherein one or more virtual viewpoint images, that include a last frame associated with a virtual viewpoint parameter closest to the virtual viewpoint parameter specified by the viewpoint information included in the received search instruction, are specified.

9. The image search system according to claim 1, wherein
a predetermined number of virtual viewpoint images are specified in ascending order of a closeness between the virtual viewpoint parameter specified by the viewpoint information included in the received search instruction and the virtual viewpoint parameter corresponding to the virtual viewpoint image.

10. The image search system according to claim 2, wherein
in a case where the virtual viewpoint image is displayed, viewpoint information indicating a virtual viewpoint parameter associated with each frame included in the displayed virtual viewpoint image is further displayed.

11. The image search system according to claim 1, wherein
the search instruction includes information to request a frequently viewed virtual viewpoint image, and
one or more virtual viewpoint images including at least a virtual viewpoint image corresponding to a virtual viewpoint parameter whose frequency of viewing is highest among a plurality of virtual viewpoint images is specified by the information included in the received search instruction.

12. The image search system according to claim 1, wherein
the predetermined condition includes a condition in which one or more virtual viewpoint images corresponding to a predetermined scene are specified.

13. The image search system according to claim 1, wherein
the predetermined condition includes a condition in which one or more virtual viewpoint images corresponding to a predetermined time are specified.

14. The image search system according to claim 13, wherein
the predetermined time is a time of the virtual viewpoint image designated by a user.

15. An image search method performed by an image search system including one or more hardware processors and one or more memories storing one or more programs configured to be executed by the one or more hardware processors, the method comprising the steps of:
receiving a search instruction, which includes viewpoint information for specifying a virtual viewpoint parameter representing at least one of a position of a virtual viewpoint and a view orientation from the virtual viewpoint, by a user;
specifying, according to a predetermined condition, one or more virtual viewpoint images which have been generated and include at least a virtual viewpoint image corresponding to a virtual viewpoint parameter closest to the virtual viewpoint parameter specified by the viewpoint information included in the received search instruction; and
causing a display device to display the specified one or more virtual viewpoint image.

16. A non-transitory computer readable storage medium storing one or more programs for causing one or more hardware processors to perform an image search method, the method comprising the steps of:
receiving a search instruction, which includes viewpoint information for specifying a virtual viewpoint parameter representing at least one of a position of a virtual viewpoint and a view orientation from the virtual viewpoint, by a user;
specifying, according to a predetermined condition, one or more virtual viewpoint images which have been generated and include at least a virtual viewpoint image corresponding to a virtual viewpoint parameter closest to the virtual viewpoint parameter specified by the viewpoint information included in the received search instruction; and
causing a display device to display the specified one or more virtual viewpoint image.

* * * * *